INVENTORS
LENNART N. BERGLUND
WILLIAM J. BARBOR
BY
ATTORNEY

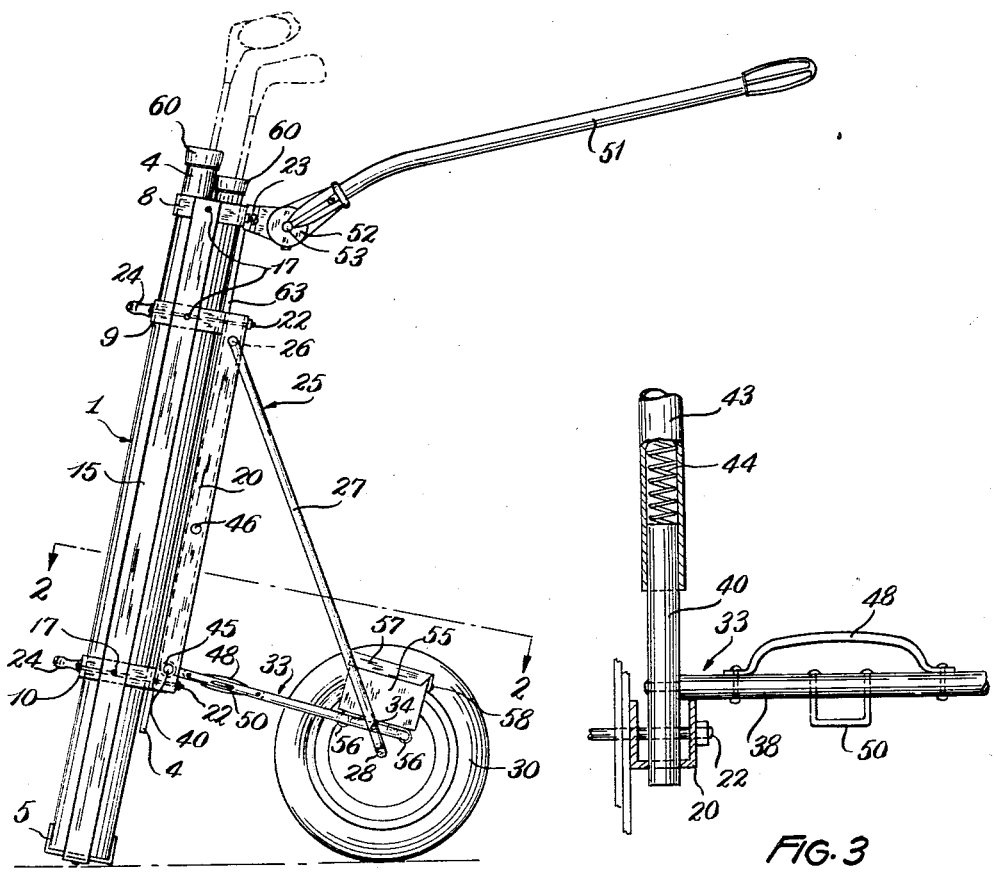
Fig. 1
Fig. 3
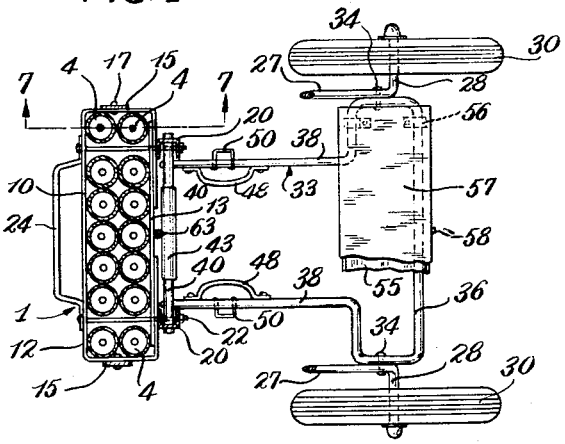
Fig. 2
INVENTORS
LENNART N. BERGLUND
WILLIAM J. BARBOR
BY
ATTORNEY Jan. 19, 1960  L. N. BERGLUND ET AL  2,921,797
GOLF CART Filed Dec. 27, 1957  2 Sheets-Sheet 2

… … … … … … … … … … … … … … … 2,921,797

GOLF CART

Lennart N. Berglund, Elyria, and William J. Barber, Wellington, Ohio

Application December 27, 1957, Serial No. 705,688

2 Claims. (Cl. 280—41)

This invention is a golf cart of unique design and construction, affording advantages hereinafter pointed out.

Devices of the class to which our invention pertains are used by golfers for carrying their clubs and related equipment about golf courses while playing, and for storing and transporting the clubs and equipment between games.

Among the more general objects of our invention are the provision of a relatively light weight golf cart that is desirably constructed in whole or in part of aluminum or other suitable light weight materials, including plastics for certain of the parts; that is especially convenient of use and handling; that is foldable between an expanded condition for use, and a contracted position for handling, transportation—as in the luggage compartment of an automobile—and storage. For the purpose of storage, the device is preferably capable of assuming a semi-expanded condition so that it will stand alone.

Another object of the invention is to provide a golf cart that is of relatively simple construction and is fabricated in most part of linear material of appropriate standard cross sectional shapes so that pieces may be cut to length or size and, where necessary, bent to shape for assembly, thus holding down the cost of manufacture to the minimum.

Another object is to provide a golf cart wherein the clubs are individually supported in orderly fashion for quick and easy selection, withdrawal and replacement.

More limitedly, an object of the invention is to provide a golf cart incorporating individual tubes for the reception of the respective shafts of the different clubs, the tubes being compactly arranged, desirably in two rows or banks, one for the longer clubs and the other for the shorter clubs of a set, the two rows or banks being so disposed that the heads of the longer clubs will swing over and not interfere with the heads of the shorter clubs when the cart is in use.

Another object of the invention is to provide a golf cart comprising an elongate body structure wherein the clubs are supported in convenient arrangement, as in the manner above mentioned, and which is equipped with struts that are pivoted to the body structure adjacent the top of the latter and carry wheels at their lower ends, a brace means or frame being pivoted to the struts in the vicinity of the wheels and that is adapted to be swung between a first position in wide or approximately right angular relation to said structure, and wherein it spaces the lower ends of the struts and consequently the wheels a substantial distance from the corresponding end of the body structure, and a second position wherein it is substantially parallel to the body structure, thereby to dispose the wheels in immediate proximity to said structure. With said brace means or frame in the second position and the cart thus contracted, the cart may be conveniently handled, as when lifting the cart and placing it in the luggage compartment of an automobile. To facilitate this operation, handles are attached to the body structure near the ends thereof, as will hereinafter appear.

A further object is to provide a construction that permits the struts to assume an intermediate position wherein the wheels are spaced a sufficient distance from the lower end of the body structure to support the cart, when resting upon said end and wheels, in upright position, so that the cart may be stood in lockers, closets, or other suitable places, when not in use.

The foregoing objects and advantages, with other more limited ones hereinafter appearing, are attained in the embodiment of the invention illustrated in the accompanying drawings wherein like reference characters designate like parts throughout the several views.

In the drawings:

Fig. 1 is a side elevational view of our improved golf cart showing it in condition for use, but with the near wheel omitted and its spindle in section;

Fig. 2 is a sectional plan on the line 2—2 of Fig. 1;

Fig. 3 is an enlarged detail, partly in section, of the brace means or frame and one of the guides wherewith it cooperates;

Figure 4:
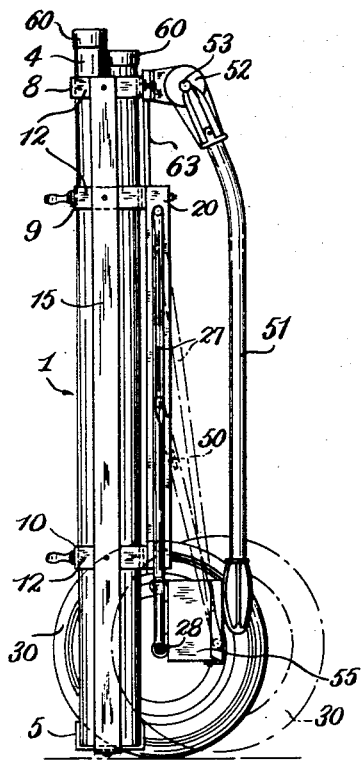
Fig. 4 is a side elevational view of the cart in contracted condition, again with the near wheel omitted.
Figure 5:
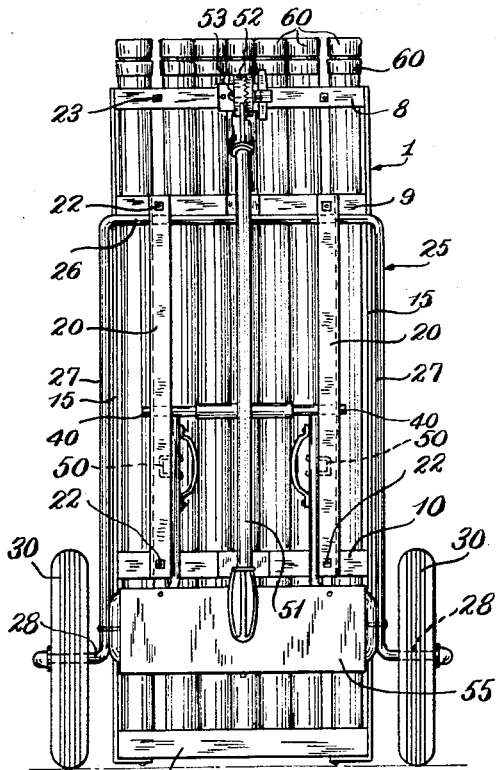
Fig. 5 is a rear elevational view of the cart in contracted condition.

For the purpose of this disclosure the cart will be described in terms appropriate to its occupying a generally upright position, as shown in Figs. 1, 4 and 5. The side of the structure on which the wheels are located will be referred to as the rear, and the opposite side, as the front.

Figure 6:
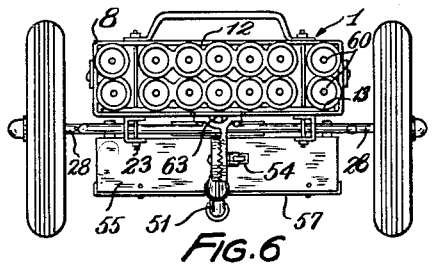
Fig. 6 is a plan view of the cart in the same condition.

The body structure of the cart, designated generally by the reference numeral 1, incorporates tubes 4, arranged in two parallel rows or banks. The lower ends of the tubes fit within an upwardly opening channel that constitutes the base 5 of the body structure. This base is desirably formed from a piece of sheet material, such as aluminum, of suitable thickness and stiffness. Surrounding and tightly embracing the rows or banks of tubes 4 adjacent their upper ends is a rectangular frame 8. Similar frames 9 and 10 are likewise engaged with the rows or banks of tubes intermediate the frame 8 and the base 5, the frame 9 being in the general region of the upper ends of the tubes, and the frame 10 a substantial distance above the base. Each of the frames 8, 9 and 10 is constructed of relatively stiff strap metal, preferably aluminum. As best shown in Figs. 2 and 6, the frame includes a band 12 that extends across the front and the ends of the rows or banks of tubes and inwardly part way across the rear side, a strip 13 overlapping and being secured to the ends of the band. Side members 15, which consist of pieces of strap metal, preferably aluminum, of suitable thickness and stiffness, have their lower ends turned inwardly at right angles beneath the ends of the base 5. The inturned ends are suitably fastened to the web of the channel that constitutes said base by rivets or other means. It may be mentioned here that said web is provided with holes that are substantially central of the tubes 4 and are for the purpose of draining the tubes of any water that may find access to the interior thereof. The side members 15 overlie the ends of the frames 8, 9 and 10 and are secured to said frames by fastening means, such as rivets.

Incorporated in the body structure 1, and located on the rear side thereof, are opposed guides 20, shown as inwardly facing channels. These guides are of a length corresponding to the spacing apart of the frames 9 and 10, and their upper and lower ends are secured to the respective frames by bolts 22 that extend through holes in the front and rear sides of the frames and through aligned apertures in the side flanges of the guides 20, nuts being applied to the rear ends of said bolts. Similar bolts 23 are extended rearwardly through the front and rear sides of the frame 8 in the vertical plane of the bolts 22. As will be observed from Figs. 2, 5 and 6, the bolts 22 and 23 are disposed between the end tubes and the adjacent tubes of the two rows or banks. A handle 24 is fastened to the front of each of the frames 9 and 10, preferably by the bolts 22 associated with said frame.

An inverted U-shaped yoke, generally designated 25, and formed of aluminum rod or the like, includes a central portion that constitutes a shaft 26, and substantially parallel side branches that constitute struts 27. The shaft 26 is journaled in bearing apertures of the opposed guides 20, and the lower ends of the struts 27 are extended outwardly in axial alignment with each other to provide spindles 28. Wheels 30 are journaled on the spindles 28 and, by suitable expedient, are held against appreciable axial movement thereon.

A brace means or frame, designated generally by the reference numeral 33, is pivoted at 34 to the laterally spaced struts 27 in the vicinity of, and on an axis parallel to, the common axis of the spindles 28. The brace means or frame 33 is desirably constructed in major part of a rod of aluminum or the like, which may be identical with that from which the yoke 25 is formed. Said rod is bent to provide a generally rectangular loop 36 and forwardly extending branches 38. The front end of each branch 38 is of reduced diameter (Fig. 3) and is extended through a diametrical hole in a plunger 40, the end of the reduced portion of said branch being upset or riveted beyond the plunger. The plungers 40, thus attached to the opposed branches 38, are slidable in the ends of a sleeve 43, and they are biased in opposite directions by a spring 44 that is contained within the sleeve 43 and is compressed between the inner ends of the two plungers 40, as well as by the inherent resiliency of the brace frame 33. The plungers are thus urged in a direction to cooperate with the guides 20. The guides 20 are provided with vertically spaced apertures 45 and 46, for the reception of the plungers 40, and when said plungers occupy the apertures 45, the brace means or frame 33 is maintained in wide or substantially right angular relation to the body structure 1, thereby to space the lower ends of the struts 27, and consequently the wheels 30, the maximum distance from the lower end of the body structure, as shown in Fig. 1, so that the cart may rest in generally upright position upon the base 5 and said wheels. Grips 48 are incorporated in the branches 38 and by grasping them and drawing them toward each other, in opposition to the spring 44 and the expanding tendency of the brace frame 33, the plungers 40 may be withdrawn from the apertures 45 and slid upwardly along the guides 20 until they register with and enter the apertures 46. When this latter occurs, the frame 33 is substantially parallel to the body structure 1, in which position it may be held by the engagement of retainers 50 within the channels of the guides 20. The parts are shown in this condition in full lines in Fig. 4. When in this contracted condition, the cart will not stand alone in an upright position. To enable it to do so, the retainers 50 are disengaged from the guides 20 and the struts 27 are swung rearwardly while the plungers 40 remain in the apertures 46, this semi-expanded condition of the cart being shown in dotted line in Fig. 4.

A handle 51 is adjustably connected to the rear side of the top portion of the body structure 1 by a conventional two-part fitting 52, the parts whereof are connected together by a bolt 53 having a wing nut 54 applied to its threaded end and by means of which mating serrated faces of the two parts are adapted to be drawn into firm contact with each other. The handle 51 is carried by one of the parts of said fitting, while the other part is secured to the rear side of the frame 8. The handle may be adjusted according to the height and to suit the comfort and convenience of an individual user. By grasping the handle and tilting the cart rearwardly so as to remove the base 5 from the ground, the cart may be pushed forwardly or drawn rearwardly and guided by means of the handle.

Golf balls, tees, etc. may be carried in a box-like receptacle 55 that is secured to the loop end 36 of the frame 33 by means of clips 56. The receptacle has a hinged top 57 that is held in closed position by latch means designated 58.

Figure 7:
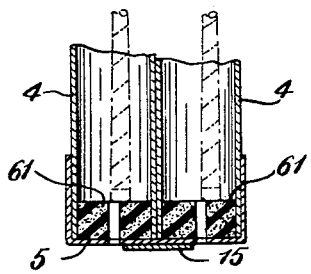
Fig. 7 is an enlarged vertical section from front to rear through the lower portion of the body structure, as indicated by the line 7—7 of Fig. 2.

The golf clubs, two of which are indicated in dotted lines in Figs. 1 and 7, are adapted to be placed, shafts down, each in a particular one of the tubes 4 assigned to such club. The clubs of a set are desirably arranged in the tubes of the two rows or banks in the order of their sizes, with the longer clubs in the longer tubes of the front row or bank, and the shorter clubs in the row or bank of shorter tubes, so that the heads of the longer clubs may swing freely over, and not interfere with, the heads of the shorter clubs.

To protect the shafts and grips of the clubs from being scratched or marred by contact with hard surfaces and possibly rough edges, thimbles 60 of suitable cushioning material, such as resilient plastic, are applied to the upper ends of the tubes 4, while pads 61 of sponge rubber or the like are fitted into the bottoms of the tubes, as shown in Fig. 7, the pads desirably having central drain holes that register with the previously mentioned holes in the web of the base 5. At present we prefer to apply the thimbles 60 by dipping the ends of the tubes in soft plastic that may be hardened by baking after application. The thimbles 60 of all but the end tubes of each row or bank may be integral, as indicated in Fig. 6.

A stay 63, which consists of a stiff rod, has its upper end clamped firmly between the rear side of the frame 8 and the adjacent part of the fitting 52. The stay extends downwardly along the rear side of the body structure in engagement with the corresponding sides of the frames 9 and 10, the lower end of the rod being disposed between the frame 10 and the sleeve 43 of the brace means 33, as best shown in Fig. 2. The purpose of this stay is to resist torque or twisting forces imposed upon the frame 8 when the cart is maneuvered by means of the handle 51.

Having thus described our invention, what we claim is:

1. In a golf cart, a body structure comprising a base in the form of a relatively shallow upwardly opening channel, two rows of tubes arranged with their lower ends confined between the side flanges of the base, three similar rectangular frames tightly embracing the tubes, the first frame being located adjacent the upper ends of the tubes, the second frame being spaced a short distance below the first frame, and the third frame a substantial distance above the base, side members attached to and rising from the ends of the base and fastened to the ends of said frames, two inwardly opening substantially parallel channels having their upper and lower ends secured, respectively, to the rear sides of the second and third frames, an inverted U-shaped yoke the central portion of which constitutes a shaft and the side branches of which constitute struts, the aforesaid channels having bearing apertures adjacent their upper ends wherein said shaft is journaled, axially aligned spindles projecting sidewise from the distal ends of the struts, wheels journaled on said spindles, brace means having an end in the form of a transversely elongated loop, and including substantially parallel branches projecting from said loop in approximately the plane thereof, pivotal means connecting said brace means at the ends of said loop to the opposed struts on an axis in the vicinity of, and substantially parallel to, the common axis of the spindles, aligned plungers carried by the ends of said branches remote from the loop, the outer ends of the plungers being guided for vertical movement in said channels, a sleeve wherein the inner ends of the plungers are slidable, a helical spring contained in the sleeve and compressed between the plungers for urging the plungers outwardly, the webs of said channels having apertures adjacent their lower ends for the reception of said plungers when the brace means is in wide angular relation to the body structure, said webs having also apertures spaced above the former apertures for the reception of said plungers when the brace means is closely adjacent the body structure, retainers on said branches for engagement within the channels to releasably hold the brace means in substantially parallel relation to the channels, and a handle pivotally connected to the rear side of the first frame.

2. In a golf cart, the combination and arrangement of parts set forth in claim 1, and, in addition thereto, a stay having its upper end rigidly secured to the rear side of the first frame and depending along the body structure and having its lower end held adjacent the rear side of the third frame.

References Cited in the file of this patent

UNITED STATES PATENTS

| | | |
|---|---|---|
| 1,960,862 | Baldwin | May 29, 1934 |
| 2,096,994 | Millen | Oct. 26, 1937 |
| 2,571,392 | Stringer | Oct. 16, 1951 |
| 2,681,232 | Womack | June 15, 1954 |
| 2,687,894 | Stoddard | Aug. 31, 1954 |
| 2,758,848 | Christensen | Aug. 14, 1956 |
| 2,761,691 | George | Sept. 4, 1956 |
| 2,784,005 | Abgarian | Mar. 5, 1957 |